US012748769B1

(12) United States Patent
Penn et al.

(10) Patent No.: US 12,748,769 B1
(45) Date of Patent: Sep. 29, 2026

(54) SYSTEMS AND METHODS FOR AN ENTERPRISE DATA TRANSMISSION FRAMEWORK

(71) Applicant: Truist Bank, Charlotte, NC (US)

(72) Inventors: David Matthew Penn, Charlotte, NC (US); Shankarram Venkataraman, Matthews, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 19/092,281

(22) Filed: Mar. 27, 2025

(51) Int. Cl.
*G06F 17/00* (2019.01)
*G06F 16/22* (2019.01)
*G06F 16/25* (2019.01)
*H04L 67/1097* (2022.01)

(52) U.S. Cl.
CPC .......... *G06F 16/254* (2019.01); *G06F 16/221* (2019.01); *H04L 67/1097* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | |
|---|---|---|---|---|
| 2014/0012948 | A1* | 1/2014 | Tanaka | G06F 3/067 709/217 |
| 2016/0197978 | A1* | 7/2016 | Morita | H04L 67/06 709/219 |
| 2016/0270053 | A1* | 9/2016 | Zeng | H04W 72/542 |
| 2017/0264559 | A1* | 9/2017 | Lu | H04L 69/06 |
| 2020/0045096 | A1* | 2/2020 | Sakai | H04L 65/612 |
| 2020/0159579 | A1* | 5/2020 | Shear | G06F 9/5072 |
| 2022/0156286 | A1* | 5/2022 | Obembe | G06F 16/27 |
| 2022/0210053 | A1* | 6/2022 | Du | H04L 45/02 |
| 2022/0342831 | A1* | 10/2022 | Charles | G06F 9/45533 |
| 2023/0282036 | A1* | 9/2023 | Simoudis | G06N 3/08 |
| 2023/0345030 | A1* | 10/2023 | Rhyu | H04N 19/119 |
| 2024/0311256 | A1* | 9/2024 | Nazari | G06F 11/1451 |

* cited by examiner

*Primary Examiner* — Hung D Le
(74) *Attorney, Agent, or Firm* — Jordan IP Law LLC; Michael A. Springs, Esq.

(57) ABSTRACT

A method, computer program product, and computer system for receiving, by a computing device, a data transmission request associated with data to be retrieved from a data source. Metadata may be generated based upon, at least in part, data requirements of the data transmission request associated with the data. A job may be generated to retrieve the metadata. The data may be retrieved from the source according to the metadata. The data retrieved from the source may be stored in a target in a location based on the metadata.

20 Claims, 8 Drawing Sheets

500

| CSV Column (Raw Input) | Mapped Metadata Attribute | Transformation Applied | Final Database Column |
|---|---|---|---|
| Request Title | metadata_request_title | Direct mapping (1:1) | request_title |
| Request Description | metadata_request_description | Direct mapping (1:1) | request_description |
| Data Domain Lead | assigned_data_lead_id | Convert human-readable name to user ID via lookup table | data_lead_id |
| Target Environment | target_environment_code | Convert dropdown values to standardized environment codes | environment |
| Smoke Test ETA | smoke_test_eta_date | Convert date format (MM/DD/YYYY → YYYY-MM-DD) | smoke_test_eta |
| Production Go Live Date | go_live_date | Convert date format | go_live_date |
| Dev Request Number | dev_request_id | Ensure numeric format, reject invalid characters | dev_request_number |
| QA/TST Request Number | qa_test_request_id | Ensure numeric format | qa_test_request_number |
| Metadata File Attachment | metadata_file_path | Extract file name and storage path | file_path |
| • • • | • • • | • • • | • • • |

FIG. 5

600

| Metadata Attribute | Description | Example Value |
|---|---|---|
| source_database | Database type to connect to | SQL Server |
| db_host | Database server hostname | database.company.com |
| db_port | Database connection port | 1433 |
| db_name | Database name | sales_db |
| source_table_name | Table to extract data from | transactions |
| columns | Columns to select | id, amount, transaction_date |
| filter_column | Column used for incremental filtering | transaction_date |
| last_extracted_timestamp | Last recorded timestamp for incremental extraction | 2025-01-01 00:00:00 |
| query_mode | Extraction mode (default or custom query) | custom |
| custom_sql_query | Custom SQL query to execute | SELECT id, amount FROM transactions WHERE amount > 1000 |
| target_storage | Location to store extracted data | s3://data-warehouse/sales/ |
| ⋮ | ⋮ | ⋮ |

FIG. 6

SYSTEMS AND METHODS FOR AN ENTERPRISE DATA TRANSMISSION FRAMEWORK

TECHNICAL FIELD

The present disclosure relates to managing data sourcing and delivery between two disparate data systems, and more particularly, to a metadata-driven, automated framework designed to streamline, scale, and simplify the development and execution of data pipelines between disparate data systems or databases without manual coding, leveraging metadata almost exclusively to automate data movement operations.

BACKGROUND

Traditionally, the development of data transmission pipelines, particularly within large organizations or during mergers, involves manual coding and extensive customization efforts. Conventional processes often rely heavily on specialized developers who write individual scripts or code for each unique data transmission request. Typically, this includes manually programming extraction routines from diverse databases such as SQL Server, Oracle, DB2, or Hive, custom-building queries, applying specific filter criteria, manually setting up data output paths, and coding customized delivery methods. Each data pipeline requires significant developer involvement, from initial coding through extensive testing, debugging, and eventual deployment to production environments. Furthermore, such manual processes must be replicated independently for each pipeline request, resulting in significant delays and increased operational costs.

SUMMARY

In one example implementation, a computer-implemented method, performed by one or more computing devices, may include but is not limited to receiving, by a computing device, a data transmission request associated with data to be retrieved from a source to a target. Metadata may be generated based upon, at least in part, data requirements of the data transmission request associated with the data. A job may be generated to retrieve the metadata. The data may be retrieved from the source according to the metadata. The data retrieved from the source may be stored in a target in a location based on the metadata.

One or more of the following example features may be included. The data requirements of the data transmission request associated with the data may include one or more of a source database storing the data, database type storing the data, a file system storing the data, a file system type storing the data, schema definitions, table name, data element of the data to extract, filter criteria, custom queries, output data format preference, target location to store the data, naming convention, and a frequency at which to execute data extraction. The data transmission request may be received from a template on a frontend computing device. The template may be a fillable form. A validation process of the data requirements of the data transmission request associated with the data may be performed. The data requirements of the data transmission request associated with the data may be converted into a structured spreadsheet. Converting may include mapping each row of the structured spreadsheet into a metadata entry aligning form columns to database columns in a metadata repository. Generating the metadata may include translating the structured spreadsheet into a structured metadata record within the metadata repository. The metadata repository may be a relational database. The metadata repository may be a non-relational database. The metadata repository may store one or more of unique data pipeline identifiers, source system details, custom queries, default queries, database filters, targeted file storage locations, file naming patterns, timestamps, and execution frequency. Source system details may include one or more of database type, schema name, table name, connection credentials, and partition details. Retrieving the data from the source according to the metadata may include triggering automated processing components that utilize the metadata to determine how to process the data. The automated processing components may compress the data. The automated processing components may format the data according to the metadata. An audit trail may be created for the metadata. The audit trail may include one or more of timestamps for execution start and completion times for retrieval of the data, transmission status, and error logs. The data may be financial data.

In another example implementation, a computing system may include one or more processors and one or more memories configured to perform operations that may include but are not limited to receiving, by a computing device, a data transmission request associated with data to be retrieved from a source to a target. Metadata may be generated based upon, at least in part, data requirements of the data transmission request associated with the data. A job may be generated to retrieve the metadata. The data may be retrieved from the source according to the metadata. The data retrieved from the source may be stored in a target in a location based on the metadata.

One or more of the following example features may be included. The data requirements of the data transmission request associated with the data may include one or more of a source database storing the data, database type storing the data, a file system storing the data, a file system type storing the data, schema definitions, table name, data element of the data to extract, filter criteria, custom queries, output data format preference, target location to store the data, naming convention, and a frequency at which to execute data extraction. The data transmission request may be received from a template on a frontend computing device. The template may be a fillable form. A validation process of the data requirements of the data transmission request associated with the data may be performed. The data requirements of the data transmission request associated with the data may be converted into a structured spreadsheet. Converting may include mapping each row of the structured spreadsheet into a metadata entry aligning form columns to database columns in a metadata repository. Generating the metadata may include translating the structured spreadsheet into a structured metadata record within the metadata repository. The metadata repository may be a relational database. The metadata repository may be a non-relational database. The metadata repository may store one or more of unique data pipeline identifiers, source system details, custom queries, default queries, database filters, targeted file storage locations, file naming patterns, timestamps, and execution frequency. Source system details may include one or more of database type, schema name, table name, connection credentials, and partition details. Retrieving the data from the source according to the metadata may include triggering automated processing components that utilize the metadata to determine how to process the data. The automated processing components may compress the data. The automated processing components may format the data according to the metadata. An audit trail may be created for the metadata. The audit trail may include one or more of timestamps for execution start and completion times for retrieval of the data, transmission status, and error logs. The data may be financial data.

In another example implementation, a computer program product may reside on a computer readable storage medium having a plurality of instructions stored thereon which, when executed across one or more processors, may cause at least a portion of the one or more processors to perform operations that may include but are not limited to receiving, by a computing device, a data transmission request associated with data to be retrieved from a source to a target. Metadata may be generated based upon, at least in part, data requirements of the data transmission request associated with the data. A job may be generated to retrieve the metadata. The data may be retrieved from the source according to the metadata. The data retrieved from the source may be stored in a target in a location based on the metadata.

One or more of the following example features may be included. The data requirements of the data transmission request associated with the data may include one or more of a source database storing the data, database type storing the data, a file system storing the data, a file system type storing the data, schema definitions, table name, data element of the data to extract, filter criteria, custom queries, output data format preference, target location to store the data, naming convention, and a frequency at which to execute data extraction. The data transmission request may be received from a template on a frontend computing device. The template may be a fillable form. A validation process of the data requirements of the data transmission request associated with the data may be performed. The data requirements of the data transmission request associated with the data may be converted into a structured spreadsheet. Converting may include mapping each row of the structured spreadsheet into a metadata entry aligning form columns to database columns in a metadata repository. Generating the metadata may include translating the structured spreadsheet into a structured metadata record within the metadata repository. The metadata repository may be a relational database. The metadata repository may be a non-relational database. The metadata repository may store one or more of unique data pipeline identifiers, source system details, custom queries, default queries, database filters, targeted file storage locations, file naming patterns, timestamps, and execution frequency. Source system details may include one or more of database type, schema name, table name, connection credentials, and partition details. Retrieving the data from the source according to the metadata may include triggering automated processing components that utilize the metadata to determine how to process the data. The automated processing components may compress the data. The automated processing components may format the data according to the metadata. An audit trail may be created for the metadata. The audit trail may include one or more of timestamps for execution start and completion times for retrieval of the data, transmission status, and error logs. The data may be financial data.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DRAWINGS

FIG. 5 is an example mapping table of a transmission process according to one or more example implementations of the disclosure;

FIG. 6 is an example mapping table of a transmission process according to one or more example implementations of the disclosure;

Like reference symbols in the various drawings indicate like elements.

DESCRIPTION

Figure 1:
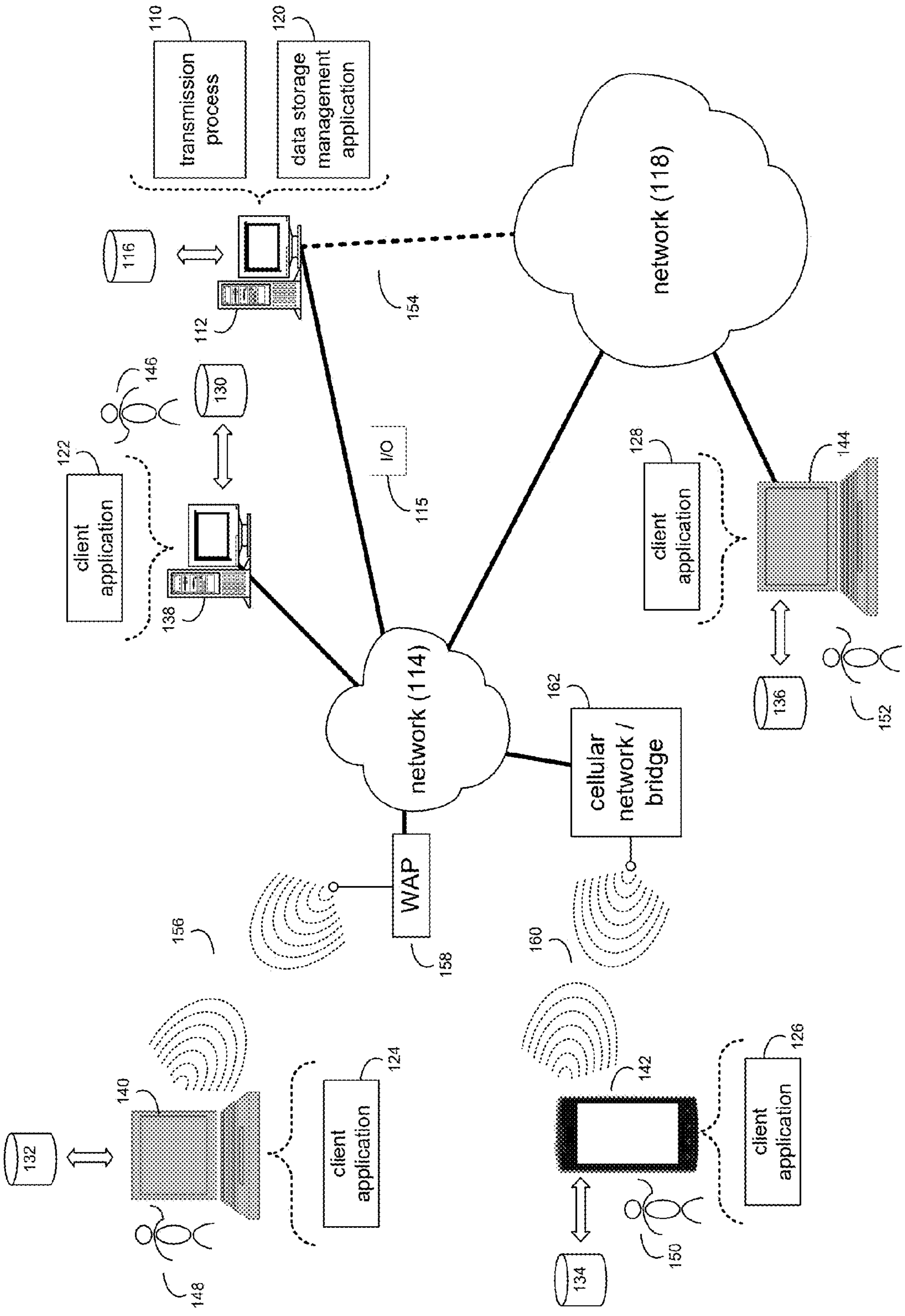
FIG. 1 is an example diagrammatic view of a transmission process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

Software may include artificial intelligence (AI) systems, which may include machine learning or other computational intelligence. For example, AI may include one or more models used for one or more problem domains. When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

In some implementations, the various computing devices may include, integrate with, link to, exchange data with, be governed by, take inputs from, and/or provide outputs to one or more AI systems, which may include models, rule-based systems, expert systems, neural networks, deep learning systems, supervised learning systems, robotic process automation systems, natural language processing systems, intelligent agent systems, self-optimizing and self-organizing systems, and others. Except where context specifically indicates otherwise, references to AI, or to one or more examples of AI, should be understood to encompass one or more of these various alternative methods and systems; for example, without limitation, an AI system described for enabling any of a wide variety of functions, capabilities and solutions described herein (such as optimization, autonomous operation, prediction, control, orchestration, or the like) should be understood to be capable of implementation by operation on a model or rule set; by training on a training data set of human tag, labels, or the like; by training on a training data set of human interactions (e.g., human interactions with software interfaces or hardware systems); by training on a training data set of outcomes; by training on an AI-generated training data set (e.g., where a full training data set is generated by AI from a seed training data set); by supervised learning; by semi-supervised learning; by deep learning; or the like. For any given function or capability that is described herein, neural networks of various types may be used, including any of the types described herein, and in embodiments a hybrid set of neural networks may be selected such that within the set a neural network type that is more favorable for performing each element of a multi-function or multi-capability system or method is implemented. As one example among many, a deep learning, or black box, system may use a gated recurrent neural network for a function like language translation for an intelligent agent, where the underlying mechanisms of AI operation need not be understood as long as outcomes are favorably perceived by users, while a more transparent model or system and a simpler neural network may be used for a system for automated governance, where a greater understanding of how inputs are translated to outputs may be needed to comply with regulations or policies.

Examples of the models (e.g., AI-based models) include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformers (GPT). Training a machine-learning model (or other type of AI-based learning models) may include supervised learning (for example, based on labelled input data), unsupervised learning, and reinforcement learning. In various embodiments, a machine-learning model may be pre-trained by their operator or by a third party. Problem domains include nearly any situation where structured data can be collected, and includes natural language processing (NLP), including natural language understanding (NLU), computer vision (CV), classification, image recognition, etc. Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc. Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

In some implementations, as noted above, AI-based learning models may include at least one of a transformer model, a convolutional neural network, a deep learning model trained on a set of outcomes of the value chain network entity, a supervised model, a semi-supervised model, an unsupervised model, or a reinforcement model, and the training data set for the AI-based learning models may include one or a set of objects or events that are labeled to classify the set of objects or events according to a classification taxonomy. Other examples of AI-based learning models (e.g., machine learning models) may include neural networks in general (e.g., deep neural networks, convolution neural networks, and many others), regression-based models, decision trees, hidden forests, Hidden Markov models, Bayesian models, and the like. In some implementations, the present disclosure may include combinations where an expert system uses one neural network for classifying an item and a different (or the same) neural network for predicting a state of the item.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium or storage device may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, solid state drives (SSDs), a digital versatile disk (DVD), a Blu-ray disc, and an Ultra HD Blu-ray disc, a static random access memory (SRAM), dynamic RAM (DRAM), synchronous DRAM (SDRAM), synchronous graphics RAM (SGRAM), and video RAM (VRAM), analog magnetic tape, digital magnetic tape, rotating hard disk drive (HDDs), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

Examples of storage implemented by the storage hardware include a distributed ledger, such as a permissioned or permissionless blockchain. Entities recording transactions, such as in a blockchain, may reach consensus using an algorithm such as proof-of-stake, proof-of-work, and proof-of-storage. Elements of the present disclosure may be represented by or encoded as non-fungible tokens (NFTs). Ownership rights related to the non-fungible tokens may be recorded in or referenced by a distributed ledger. Transactions initiated by or relevant to the present disclosure may use one or both of fiat currency and cryptocurrencies, examples of which include bitcoin and ether.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, state information that personalizes electronic circuitry and/or other structural components that are native to hardware (e.g., host processor, central processing unit/CPU, microcontroller, etc.) or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a network, such as a cellular network, local area network (LAN), a wide area network (WAN), a body area network BAN), a personal area network (PAN), a metropolitan area network (MAN), etc., or the connection may be made to an external computer (for example, through the internet using an Internet Service Provider). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs), etc. In some implementations, electronic circuitry including, for example, programmable logic circuitry, an application specific integrated circuit (ASIC), gate arrays such as field-programmable gate arrays (FPGAs) or other hardware accelerators, micro-controller units (MCUs), or programmable logic arrays (PLAs), integrated circuits (ICs), digital circuit elements, analog circuit elements, combinational logic circuits, digital signal processors (DSPs), complex programmable logic devices (CPLDs), memory chips, network chips, systems on chip (SoCs), SSD/NAND controller ASICs, and the like, etc. may execute the computer readable program instructions/code by utilizing state information of the computer readable program instructions to personalize the electronic circuitry, in order to perform aspects of the present disclosure. Configurable or fixed-functionality logic may be implemented with complementary metal oxide semiconductor (CMOS) logic circuits, transistor-transistor logic (TTL) logic circuits, or other circuits. Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack. Examples of a system-on-chip include a radio frequency (RF) system-on-chip, an AI system-on-chip, a video processing system-on-chip, an organ-on-chip, a quantum algorithm system-on-chip, etc.

Examples of processing hardware may include, e.g., a central processing unit (CPU), a graphics processing unit (GPU), an accelerator (e.g., an AI accelerator), an approximate computing processor, a quantum computing processor, a parallel computing processor, a neural network processor, a signal processor, a digital processor, an analog processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an AI co-processor.

In some implementations, the AI accelerator may include suitable logic, circuitry, and/or interfaces to accelerate artificial intelligence applications, such as, e.g., artificial neural networks, machine vision and machine learning applications, including through parallel processing techniques. In one or more examples, the AI accelerator may include hardware logic or devices such as, e.g., a GPU or an FPGA. The AI accelerator may be used with any of the devices, components, features or methods described herein.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved. In addition, in some of the drawings, signal conductor lines may be represented with lines. Some may be different, to indicate more constituent signal paths, have a number label, to indicate a number of constituent signal paths, and/or have arrows at one or more ends, to indicate primary information flow direction(s). This, however, should not be construed in a limiting manner. Rather, such added detail may be used in connection with one or more implementations to facilitate ease of understanding. Any represented lines, whether or not having additional information, may actually comprise one or more signals/information that may travel in multiple directions and may be implemented with any suitable type of signal scheme, e.g., digital or analog lines implemented with differential pairs, optical fiber lines, and/or single-ended lines, etc.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown transmission process 110 that may reside on and may be executed by a computer (e.g., computer 112), which may be connected to a network (e.g., network 114) (e.g., the internet or a local area network). Examples of computer 112 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 112 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a transmission process, such as transmission process 110 of FIG. 1, may receive, by a computing device, a data transmission request associated with data to be retrieved from a source to a target. Metadata may be generated based upon, at least in part, data requirements of the data transmission request associated with the data. A job may be generated to retrieve the metadata. The data may be retrieved from the source according to the metadata. The data retrieved from the source may be stored in a target in a location based on the metadata.

In some implementations, the instruction sets and subroutines of transmission process 110, which may be stored on storage device, such as storage device 116, coupled to computer 112, may be executed by one or more processors and one or more memory architectures included within computer 112. In some implementations, storage device 116 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 116 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 114 may be connected to one or more secondary networks (e.g., network 118), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 112 may include a data store, such as a database (e.g., relational database, object-oriented database, triplestore database, etc.), a data store, a data lake, a column store, and/or a data warehouse, and may be located within any suitable memory location, such as storage device 116 coupled to computer 112. In some implementations, data, metadata, information, etc. described throughout the present disclosure may be stored in the data store. In some implementations, computer 112 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, transmission process 110 may be a component of the data store, a standalone application that interfaces with the above noted data store and/or an applet/application that is accessed via client applications 122, 124, 126, 128. In some implementations, the above noted data store may be, in whole or in part, distributed in a cloud computing topology. In this way, computer 112 and storage device 116 may refer to multiple devices, which may also be distributed throughout the network.

In some implementations, computer 112 may execute a data storage management application (e.g., data storage management application 120), examples of which may include, but are not limited to, e.g., a network-attached storage (NAS) management application, a cloud storage management application, a backup and recovery application, a file synchronization application, a deduplication application, a data encryption application, a storage virtualization application, a database management application, or other application that facilitates data storage, organization, retrieval, and protection. [In some implementations, transmission process 110 and/or data storage management application 120 may be accessed via one or more of client applications 122, 124, 126, 128. In some implementations, transmission process 110 may be a standalone application, or may be an applet/application/script/extension that may interact with and/or be executed within data storage management application 120, a component of data storage management application 120, and/or one or more of client applications 122, 124, 126, 128. In some implementations, data storage management application 120 may be a standalone application, or may be an applet/application/script/extension that may interact with and/or be executed within transmission process 110, a component of transmission process 110, and/or one or more of client applications 122, 124, 126, 128. In some implementations, one or more of client applications 122, 124, 126, 128 may be a standalone application, or may be an applet/application/script/extension that may interact with and/or be executed within and/or be a component of transmission process 110 and/or data storage management application 120. Examples of client applications 122, 124, 126, 128 may include, but are not limited to, e.g., a network-attached storage (NAS) management application, a cloud storage management application, a backup and recovery application, a file synchronization application, a deduplication application, a data encryption application, a storage virtualization application, a database management application, or other application that facilitates data storage, organization, retrieval, and protection, a chatbot application, a virtual assistant application, a standard and/or mobile web browser, an email application (e.g., an email client application), a textual and/or a graphical user interface, a customized web browser, a plugin, an Application Programming Interface (API), or a custom application. The instruction sets and subroutines of client applications 122, 124, 126, 128, which may be stored on storage devices 130, 132, 134, 136, may be executed by one or more processors and one or more memory architectures incorporated into client electronic devices 138, 140, 142, 144.

In some implementations, one or more of storage devices 130, 132, 134, 136, may include but are not limited to: hard disk drives; flash drives, tape drives; optical drives; RAID arrays; random access memories (RAM); and read-only memories (ROM). Examples of client electronic devices 138, 140, 142, 144 (and/or computer 112) may include, but are not limited to, a personal computer (e.g., client electronic device 138), a laptop computer (e.g., client electronic device 140), a smart/data-enabled, cellular phone (e.g., client electronic device 142), a notebook computer (e.g., client electronic device 144), a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone/speaker (such as those embedded within eyeglasses, smart phones, tablet computers, smart televisions, smart speakers, watches, etc.), an infotainment device (e.g., such as those found in vehicles combining information and/or entertainment with optional screens and/or audio for such things as navigation, multimedia, connectivity, voice control, smartphone integration, touchscreen interface, internet and apps, rear-seat entertainment, etc.), a dedicated network device, and combinations thereof. Client electronic devices 138, 140, 142, 144 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 122, 124, 126, 128 may be configured to effectuate some or all of the functionality of transmission process 110 (and vice versa). Accordingly, in some implementations, transmission process 110 may be a purely server-side application, a purely client-side application, or a hybrid server-side/client-side application that is cooperatively executed by one or more of client applications 122, 124, 126, 128 and/or transmission process 110.

In some implementations, one or more of client applications 122, 124, 126, 128 may be configured to effectuate some or all of the functionality of data storage management application 120 (and vice versa). Accordingly, in some implementations, data storage management application 120 may be a purely server-side application, a purely client-side application, or a hybrid server-side/client-side application that is cooperatively executed by one or more of client applications 122, 124, 126, 128 and/or data storage management application 120. As one or more of client applications 122, 124, 126, 128, transmission process 110, and data storage management application 120, taken singly or in any combination, may effectuate some or all of the same functionality, any description of effectuating such functionality via one or more of client applications 122, 124, 126, 128, transmission process 110, data storage management application 120, or combination thereof, and any described interaction(s) between one or more of client applications 122, 124, 126, 128, transmission process 110, data storage management application 120, or combination thereof to effectuate such functionality, should be taken as an example only and not to limit the scope of the disclosure.

In some implementations, one or more of users 146, 148, 150, 152 may access computer 112 and transmission process 110 (e.g., using one or more of client electronic devices 138, 140, 142, 144) directly through network 114 or through network 118. Further, computer 112 may be connected to network 114 through network 118, as illustrated with phantom link line 154. Transmission process 110 may include one or more user interfaces, such as browsers and textual or graphical user interfaces, through which users 146, 148, 150, 152 may access transmission process 110.

In some implementations, the various client electronic devices may be directly or indirectly coupled to network 114 (or network 118). For example, client electronic device 138 is shown directly coupled to network 114 via a hardwired network connection. Further, client electronic device 144 is shown directly coupled to network 118 via a hardwired network connection. Client electronic device 140 is shown wirelessly coupled to network 114 via wireless communication channel 156 established between client electronic device 140 and wireless access point (i.e., WAP 158), which is shown directly coupled to network 114. WAP 158 may be, for example, an IEEE 802.11a, 802.11b, 802.11g, 802.11n, 802.11ac, Wi-Fi®, RFID, and/or Bluetooth™ (including Bluetooth™ Low Energy) or any device that is capable of establishing wireless communication channel 156 between client electronic device 140 and WAP 158 (e.g., Zigbee, Z-Wave, etc.). Client electronic device 142 is shown wirelessly coupled to network 114 via wireless communication channel 160 established between client electronic device 142 and cellular network/bridge 162, which is shown by example directly coupled to network 114.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used. In some implementations, computer 112 may be directed or controlled by an operator. Computer 112 may be hosted by one or more of assets owned by the operator, assets leased by the operator, and third-party assets. The assets may be referred to as a private, community, or hybrid cloud computing network or cloud computing environment. For example, computer 112 may be partially or fully hosted by a third-party offering software as a service (Saas), platform as a service (PaaS), and/or infrastructure as a service (IaaS). Computer 112 may be implemented using agile development and operations (DevOps) principles. In some implementations, some or all of computer 112 may be implemented in a multiple-environment architecture. For example, the multiple environments may include one or more production environments, one or more integration environments, one or more development environments, etc.

In some implementations, various I/O requests (e.g., I/O request 115) may be sent from, e.g., client applications 122, 124, 126, 128 to, e.g., computer 112 (and vice versa). Examples of I/O request 115 may include but are not limited to, data write requests (e.g., a request that content be written to computer 112) and data read requests (e.g., a request that content be read from computer 112). I/O request 115 may include onboarding forms (discussed below), as well as any of the data, metadata, or information described throughout. Client electronic devices 138, 140, 142, 144 and/or computer 112 may also communicate audibly using an audio codec, which may receive spoken information from a user and convert it to usable digital information. An audio codec may likewise generate audible sound for a user, such as through a speaker, e.g., in a handset of a client electronic device. Such sound may include sound from voice telephone calls, may include recorded sound (e.g., voice messages, music files, etc.) and may also include sound generated by applications operating on the client electronic devices.

Figure 2:
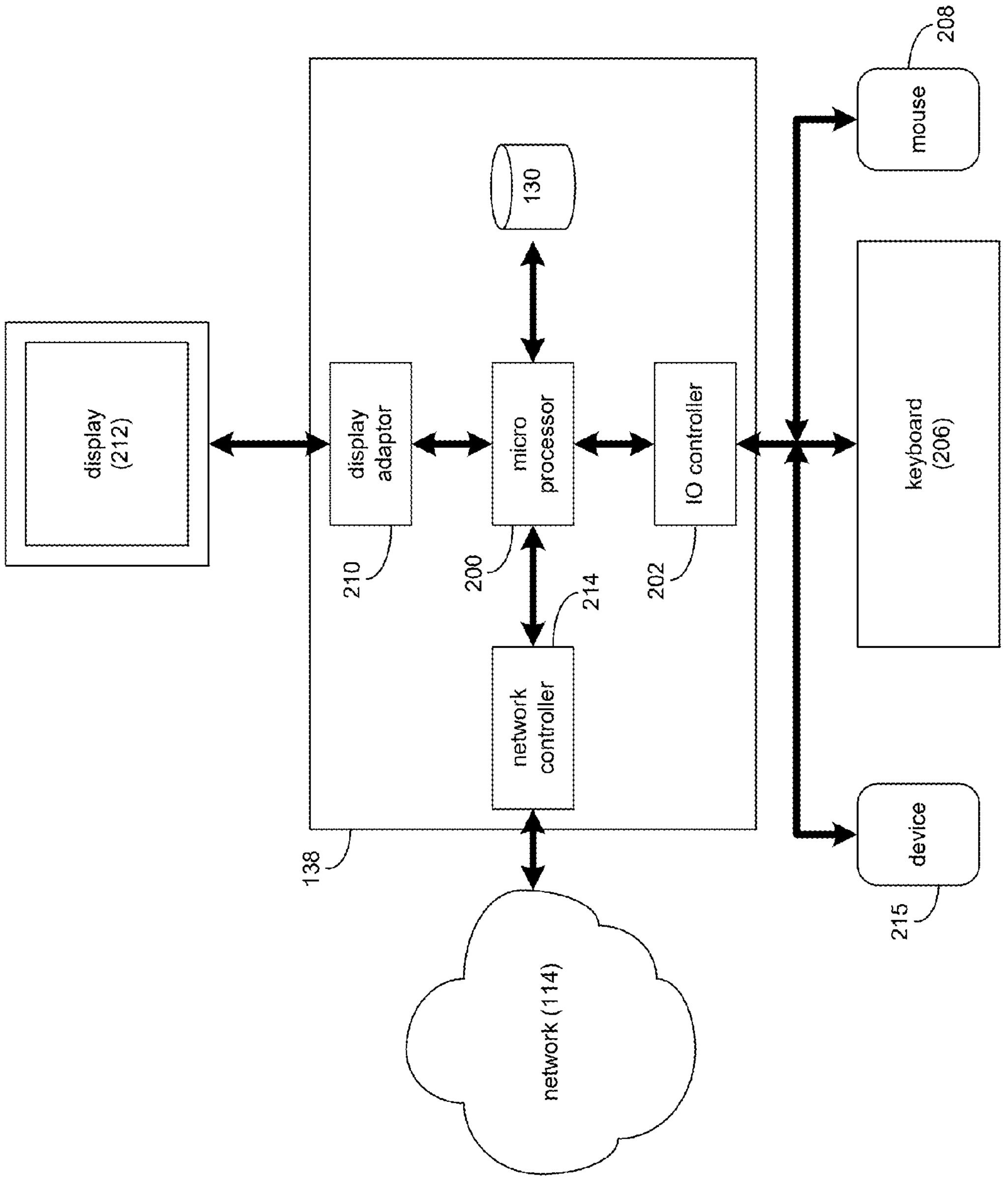
FIG. 2 is an example diagrammatic view of a computer of FIG. 1 according to one or more example implementations of the disclosure.
Figure 3:
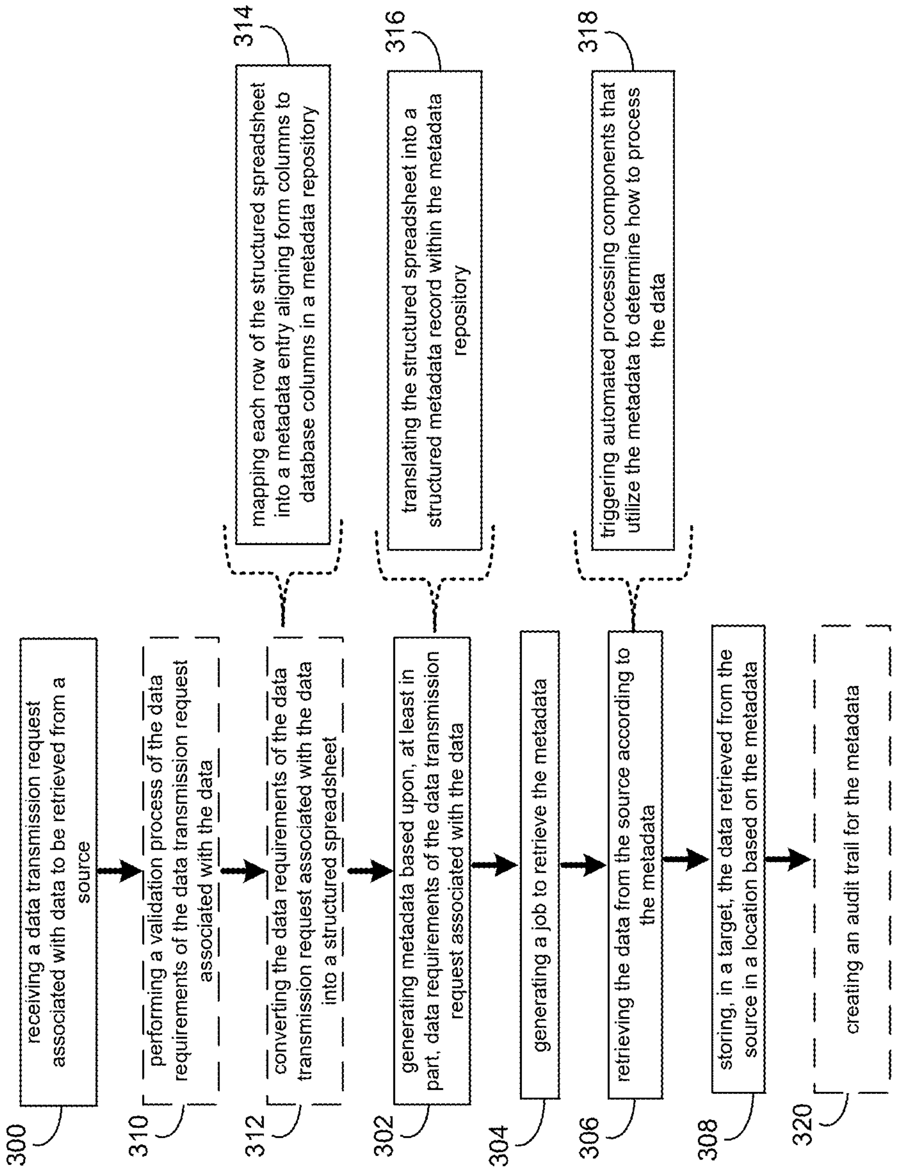
FIG. 3 is an example flowchart of a transmission process according to one or more example implementations of the disclosure.
Figure 4:
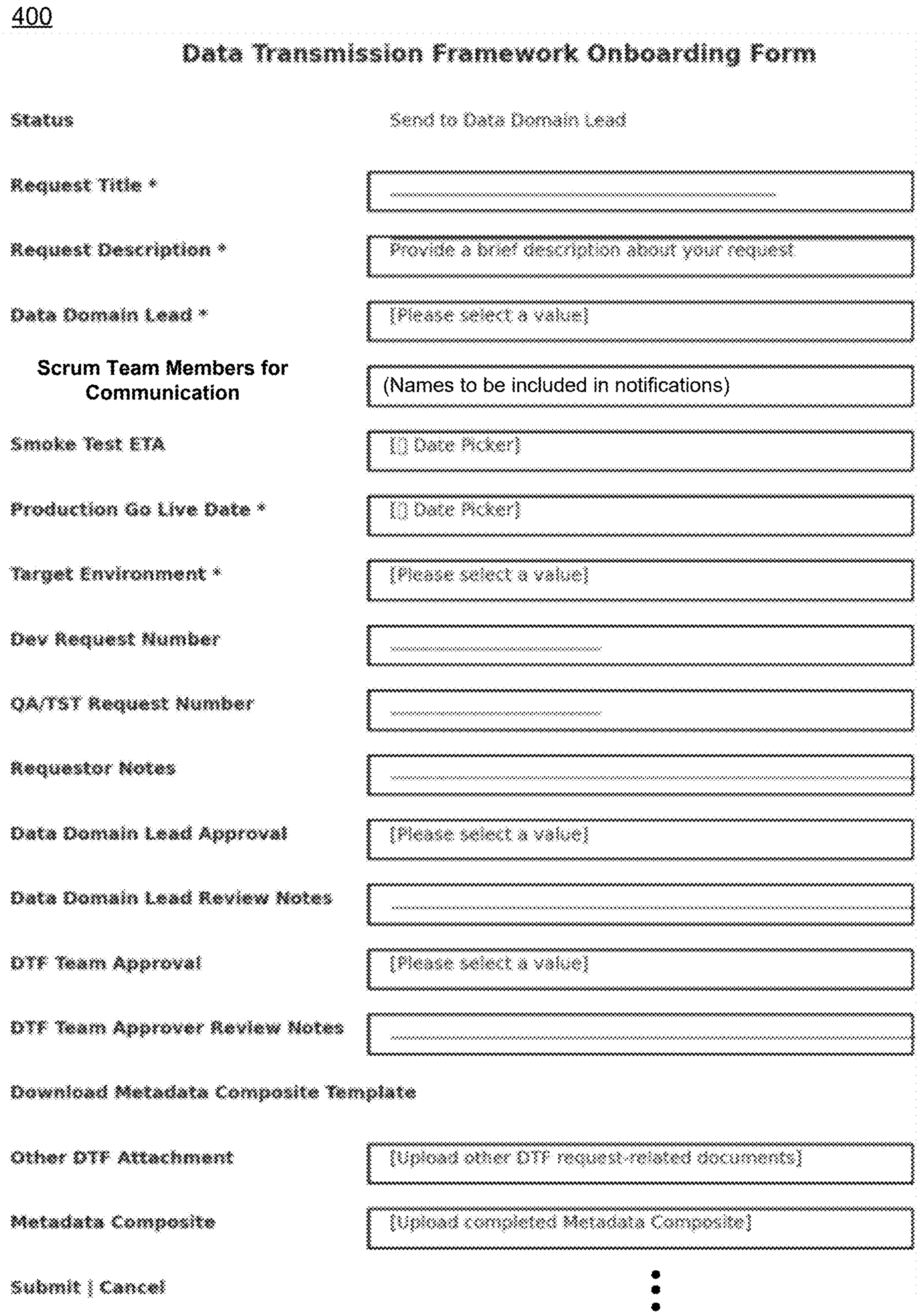
FIG. 4 is an example diagrammatic view of a screen image of an onboarding form displayed by a transmission process according to one or more example implementations of the disclosure.

Referring also to the example implementation of FIG. 2, there is shown a diagrammatic view of client electronic device 138. While client electronic device 138 is shown in this figure, this is for example purposes only and is not intended to be a limitation of this disclosure, as other configurations are possible. Additionally, any computing device capable of executing, in whole or in part, transmission process 110 may be substituted for client electronic device 138 (in whole or in part) within FIG. 2, examples of which may include but are not limited to computer 138 and/or one or more of client electronic devices 112, 140, 142, 144.

In some implementations, client electronic device 138 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 130). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), scanner, custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to network 114 (e.g., the Internet or a local area network).

As noted above, traditionally, the development of data transmission pipelines, particularly within large organizations or during mergers, involves manual coding and extensive customization efforts. Conventional processes often rely heavily on specialized developers who write individual scripts or code for each unique data transmission request. Typically, this includes manually programming extraction routines from diverse databases such as SQL Server, Oracle, DB2, or Hive, custom-building queries, applying specific filter criteria, manually setting up data output paths, and coding customized delivery methods. Each data pipeline requires significant developer involvement, from initial coding through extensive testing, debugging, and eventual deployment to production environments. Furthermore, such manual processes must be replicated independently for each pipeline request, resulting in significant delays and increased operational costs.

Due to the manual nature of current approaches, organizations frequently encounter significant bottlenecks. Data pipeline projects that require transferring large volumes of data or handling complex, high-frequency requests become slow, expensive, and resource-intensive. As data demands increase—especially during mergers, system integrations, or large-scale data migration efforts—the time and labor costs associated with manually coding and maintaining numerous pipelines rapidly escalate, creating significant operational inefficiencies, and financial burdens. Therefore, there exists a clear and urgent need for an automated, scalable solution that significantly reduces or eliminates manual developer intervention in the creation and execution of data pipelines.

As will be discussed in greater detail below, the present disclosure addresses these technical shortcomings by introducing a uniquely metadata-driven data transmission framework. This framework radically simplifies and accelerates the entire data transmission pipeline creation and management process through the innovative use of metadata. By enabling users to specify detailed data transmission requirements via standardized onboarding forms and automatically converting those requirements into structured metadata entries, the framework eliminates the manual coding traditionally associated with each data pipeline. The present disclosure dynamically retrieves this metadata to automate data extraction, formatting, compression, and transmission seamlessly. As a result, development time, resource requirements, and operational expenses are drastically reduced, greatly enhancing scalability, reliability, and agility in managing complex, large-scale data environments, particularly when it comes to transferring large amounts of data over network systems. This metadata-driven approach offers exceptional technical advantages in speed, cost savings, flexibility, and ease of use, fundamentally transforming traditional data management practices and providing substantial value to organizations facing modern data management challenges.

The Transmission Process:

As discussed above and referring also at least to the example implementations of FIGS. 3-8, transmission process 110 may receive 300, by a computing device, a data transmission request associated with data to be retrieved from a source. Transmission process 110 may generate 302 metadata based upon, at least in part, data requirements of the data transmission request associated with the data. Transmission process 110 may generate 304 a job to retrieve the metadata. Transmission process 110 may retrieve 306 the data from the source according to the metadata. Transmission process 110 may store 308 the data retrieved from the source in a target in a location based on the metadata.

In some implementations, the data may be financial data but it will be appreciated after reading the present disclosure that any data type may be used without departing from the scope of the present disclosure. Additionally, it will be appreciated after reading the present disclosure that the data retrieval aspect of the present disclosure may also be used for data migration without departing from the scope of the present disclosure. As such, the use of a metadata based data pipeline for queries should be taken as example only and not to otherwise limit the scope of the present disclosure.

In some implementations, transmission process 110 may receive 300, by a computing device, a data transmission request associated with data to be retrieved from a source (e.g., storage devices 136 from FIG. 1). An automated, metadata-driven data transmission framework involves several technically detailed steps. The first step includes receiving a structured data transmission request from a user via an onboarding form. In some implementations, the data transmission request may be received from a template on a frontend computing device, and in some implementations, the template may be a fillable form. For example, and referring at least to the example implementation of FIG. 4, an example form (e.g., onboarding form 400) is shown. Onboarding form 400 is designed to capture application data pipeline requirements efficiently. It collects essential details from the requestor, including the request title, description, and the selection of a Data Domain Lead. Additional fields allow the requestor to specify Scrum Team Members for communication, provide an estimated timeline for the smoke test and production go-live date, and select the target environment. The form also includes fields for entering a development request number, QA/UAT request number, and any additional notes. To ensure proper approval and oversight, the form includes dedicated sections for Data Domain Lead Approval and DTF Team Approval, with space for review notes. Additionally, the onboarding process incorporates a Metadata Composite Template, which contains structured data element columns to be completed and uploaded once finalized. Requestors can also attach other relevant DTF-related documents.

Once submitted, the requestor may receive an email containing the DTF Request Number along with the captured requirements. The DTF Solution Team then reviews the request, contacts the requestor for further clarification if needed, and ensures all necessary details are in place. After the review process is completed and approvals are granted, the request is executed. This structured onboarding form helps streamline the data pipeline onboarding process while ensuring proper documentation, approval workflows, and metadata management.

In some implementations, the data requirements of the data transmission request associated with the data may include one or more of a source database storing the data, database type storing the data, a file system storing the data, a file system type storing the data, schema definitions, table name, data element of the data to extract, filter criteria, custom queries, output data format preference, target location to store the data, naming convention, and a frequency at which to execute data extraction. For example, onboarding form 400 may further enable a user to use fields to specify detailed data requirements including source databases, database types (such as SQL Server, Oracle, DB2, Hive, etc.), schema definitions, precise table names, specific data elements to extract, filter criteria (e.g., partition information, specific dates, or other conditional parameters), custom SQL queries if required, output data format preferences, target file paths, naming conventions, and the frequency at which data extraction should occur. This structured onboarding form may be implemented in an Excel or similar structured spreadsheet format, as well as any other convenient format. It will be appreciated after reading the present disclosure that more or less fields, as well as different fields, may be used to collect varying types of information. As such, the use the specific fields shown and/or discussed should be taken as example only and not to otherwise limit the scope of the present disclosure.

In some implementations, transmission process 110 may perform 310 a validation process of the data requirements of the data transmission request associated with the data. As noted above, the structured onboarding form may undergo a detailed validation and verification process to ensure the completeness, accuracy, and technical feasibility of the submitted data requirements. This step may involve manual or AI review sessions with the requesting team to clarify and refine requirements.

In some implementations, transmission process 110 may convert 312 the data requirements of the data transmission request associated with the data into a structured spreadsheet, which in some implementations, converting may include mapping 314 each row of the structured spreadsheet into a metadata entry aligning form columns to database columns in a metadata repository. For example, after the validation/verification process, the form may be automatically transformed into a CSV (comma-separated values) format (or other appropriate format). The CSV conversion involves mapping each row of the form directly into a metadata entry, aligning form columns precisely to database columns in the metadata repository. An example mapping table 500 is shown in FIG. 5.

This transformation ensures seamless storage, processing, and integration with the metadata repository. This transformation is used because the form submission is typically unstructured and needs to be standardized for database (or file system) integration, automated processing, and interoperability across systems. The conversion process involves extracting form data, mapping each field to corresponding database columns, and formatting it for structured storage.

The first step in this process is data extraction, where transmission process 110 retrieves user-submitted form data, typically stored in JSON or XML format. Each field is then mapped to a corresponding metadata repository column, ensuring that all values are correctly aligned with predefined schemas. Some fields may require transformation, such as converting dropdown selections into standardized codes, reformatting dates into a consistent format (e.g., MM/DD/YYYY→YYYY-MM-DD), or looking up IDs for human-readable values. Nested or hierarchical data may be flattened to fit into a tabular structure, ensuring compatibility with the target database. Once the mapping is complete, the extracted data is written by transmission process 110 into a CSV file with a structured format. The first row contains column headers that define the metadata attributes, followed by rows containing the actual form data entries. For example, the request title, description, assigned data lead, target environment, and go-live date are transformed into structured, comma-separated values that align with database schema fields. Additionally, file attachments such as metadata templates may be referenced in the CSV as storage paths or URLs.

As will be discussed in greater detail below, after the CSV is generated, transmission process 110 may ingest it into the metadata repository using various methods. Transmission process 110 may directly import it imported into a relational database (e.g., PostgreSQL, MySQL) using bulk-loading SQL commands, sent to a metadata management API such as Apache Atlas or Collibra, or processed through an ETL pipeline for further data transformation before storage. Before finalizing the ingestion, AI-driven validation checks may be used to ensure the data is complete, correctly formatted, and free from duplicates or inconsistencies. By converting form submissions into a standardized CSV format, organizations enable efficient metadata storage, automated validation, and seamless integration with enterprise data pipelines. This structured approach ensures that metadata remains queryable, standardized, and actionable for governance, automation, and future processing.

In some implementations, instead of human teams performing the review and validation, transmission process 110 may include AI coding to streamline the DTF (Data Transmission Framework) Onboarding Form review and approval process by automating validation, analysis, and decision-making. Instead of relying on a DTF Solution Team, transmission process 110 can ensure all required fields are completed and cross-check values for accuracy. It can validate request details such as the project title, description, target environment, and timeline, etc. while ensuring that metadata uploads follow predefined formats. Using Natural Language Processing (NLP), transmission process 110 may analyze request descriptions, compare them with historical data, and identify unclear terms that may require clarification, which may be sent to the requestor.

Beyond validation, transmission process 110 may intelligently route and prioritize requests based on urgency and complexity. It can automatically assign priority levels, approve standard requests that meet predefined criteria, and flag complex or non-compliant submissions for human review. Additionally, transmission process 110 may analyze the Metadata Composite Template (e.g., onboarding form 400) to verify that all required data elements are present and conform to compliance policies, such as data governance and security standards. If discrepancies are found, transmission process 110 can suggest corrections or request additional input from the requestor.

The approval process itself can also be automated using machine learning models that apply business rules to determine whether a request should be approved, flagged for manual review, or rejected. Once a decision is made, transmission process 110 can generate an approval response and notify relevant stakeholders via email or a dashboard. Over time, transmission process 110 can refine its decision-making capabilities by analyzing past approvals and rejections, leading to continuous improvements in accuracy and efficiency. By replacing the traditional manual review process, transmission process 110 can further accelerate onboarding beyond the tremendous technical advantages of automating the data transmission pipelines, reduce errors, and ensure data pipeline requests meet organizational requirements with no or minimal human intervention.

In some implementations, transmission process 110 may generate 302 metadata based upon, at least in part, data requirements of the data transmission request associated with the data, and in some implementations, generating the metadata may include translating 316 the structured spreadsheet into a structured metadata record within the metadata repository. Following validation, a metadata generation process is executed, which takes the standardized CSV file (discussed above) as input and systematically translates it into structured metadata records within a dedicated metadata repository. For example, and referring still to mapping table 500, once the validation process is complete, transmission process 110 executes a metadata generation process to convert/translate the standardized CSV file into structured metadata records within a dedicated metadata repository. This transformation enables queryable, organized, and system-compatible metadata storage that integrates with data governance, analytics, and automation frameworks. In the example, transmission process 110 parses the CSV file, where each row represents an individual metadata record, and each column corresponds to a predefined metadata attribute. Transmission process 110 reads these structured rows and maps them to fields in the metadata repository schema, ensuring consistency with predefined data models. If necessary, additional data transformations are applied, including type conversions (e.g., text to numeric IDs), standardization (e.g., normalizing categorical values), and relationship resolution (e.g., linking requestor names to user IDs), etc.

The parsed and mapped data is then ingested into the metadata repository, typically a relational database (PostgreSQL, MySQL, Oracle), a non-relational database (e.g., Hive, MongoDB) or a graph-based metadata store (e.g., Apache Atlas, Collibra, Alation). The ingestion process involves executing structured queries (SQL/NoSQL) or interacting with metadata management APIs to create or update records. Depending on the architecture, transmission process 110 may employ batch processing (for bulk ingestion) or real-time streaming pipelines (for immediate updates). For traceability and compliance, the metadata generation process of transmission process 110 may include logging mechanisms, tracking timestamped changes, versioning updates, and auditing user interactions (discussed further below). If errors or inconsistencies arise during the mapping process, exception handling routines trigger corrective actions, such as requesting user confirmation, defaulting to fallback values, or flagging issues for manual review.

In some implementations, the metadata repository may store one or more of unique data pipeline identifiers, source system details, custom queries, default queries, database filters, targeted file storage locations, file naming patterns, timestamps, and execution frequency, and in some implementations, source system details may include one or more of database type, schema name, table name, connection credentials, and partition details. For instance, as discussed above, the metadata repository stores explicit metadata details that may include, but is not limited to, unique data pipeline identifiers, source system details (e.g., database type, schema name, table name, connection credentials, partition details), custom SQL queries or default queries (select-star if custom queries are not provided), specific database filters, targeted file storage locations, file naming patterns, timestamps, execution frequency, and additional configuration parameters.

In some implementations, transmission process 110 may generate 304 a job to retrieve the metadata, where, in some implementations, transmission process 110 may retrieve 306 the data from the source according to the metadata, and in some implementations, retrieving the data from the source according to the metadata may include triggering 318 automated processing components that utilize the metadata to determine how to process the data. As is known to those skilled in the art, a "job" is a term of art in computing, often referring to a higher-level execution unit for the scheduled execution of a program, script, or workflow, while a "task" is usually a subcomponent of a job, which may run in parallel with multiple other tasks for the job. For instance, and referring at least to the example implementation of FIG. 6, an example table 600 shows how metadata records translate into dynamic pipeline execution parameters. Once metadata is stored in a metadata repository, an orchestrator system such as Apache Airflow, Prefect, or a custom-built workflow engine retrieves (e.g., via transmission process 110) this metadata dynamically to automate data pipeline execution without requiring manual coding. This metadata-driven orchestration enables adaptive and configurable workflows where data pipelines adjust dynamically based on metadata parameters rather than hardcoded logic. The orchestrator (e.g., via transmission process 110) accesses the metadata repository through SQL queries, REST API calls, or direct file access to retrieve structured metadata records. These records provide execution parameters, such as which database system to connect to (e.g., SQL Server, Oracle, DB2, Hive), the specific dataset or table to extract (e.g., financial data transactions involving withdrawals, etc.), query execution logic, and filtering rules for data extraction. Once the orchestrator retrieves the necessary metadata, it triggers automated scripts or processing components that execute data extraction, transformation, and loading (ETL/ELT). These scripts may be implemented using technologies such as Python-based ETL frameworks (e.g., Pandas, SQLAlchemy), big data processing tools (e.g., PySpark), and specialized data extraction tools (e.g., Apache Sqoop for bulk database extraction). The orchestrator (e.g., via transmission process 110) dynamically constructs database connection strings, authentication credentials, and SQL queries based on metadata values. For example, a JDBC URL for SQL Server may be generated using metadata fields, allowing the ETL job to establish a secure database connection. Similarly, a custom SQL extraction query may be generated based on predefined metadata parameters, selecting specific columns or applying date-based filtering for incremental extraction. If no custom query is provided, a default query such as SELECT * FROM table may be executed instead.

Once the script is triggered, the pipeline (e.g., via transmission process 110) executes the appropriate SQL queries to extract data efficiently. The metadata may specify partition-based or time-based filtering to optimize the data extraction process, ensuring only relevant data is retrieved. For example, an extraction job may use a last extracted timestamp stored in metadata to retrieve only new records added since the last pipeline run. The extracted data is then loaded into a staging area, data lake, or cloud storage solution such as Amazon S3, Google Cloud Storage, or Azure Data Lake, before further transformations are applied. Throughout the process, the orchestrator dynamically manages workflow execution, monitoring, and error handling using metadata configurations. If errors occur, transmission process 110 can reference metadata-defined retry policies or error-handling rules to determine whether the job should be retried, logged, or flagged for manual intervention. By leveraging metadata-driven orchestration, organizations can eliminate manual coding, scale pipeline execution across multiple data sources, and ensure consistency and auditability in their ETL workflows. This approach enables greater technical flexibility, automation, and governance, making data pipelines more efficient and adaptable.

In some implementations, the automated processing components may compress the data and/or may may format the data according to the metadata. For instance, after the data extraction phase, transmission process 110 may initiate automated post-processing workflows to optimize the extracted dataset for efficient storage, transmission, and further downstream processing. These workflows leverage metadata-driven instructions of the present disclosure to apply compression, formatting, and encoding techniques tailored to the data's intended use. The compression process minimizes storage footprint, reducing network latency, and accelerating data movement across distributed systems. Transmission process 110 may dynamically select a compression algorithm based on predefined metadata configurations or source data characteristics. Example algorithms may include Gzip (GNU zip), ZIP, LZ4, Snappy, and Zstandard (Zstd), each chosen for its balance of compression ratio, speed, and decompression efficiency.

Beyond compression, transmission process 110 may also reformat the data based on metadata-driven specifications. The extracted raw dataset may initially be structured as CSV, JSON, XML, or Avro, (as discussed above) but depending on the target storage or processing engine, it may be converted to more efficient formats such as Parquet or ORC. Additionally, encoding mechanisms such as Base64 encoding for binary data or UTF-8 standardization for text data may be applied to ensure compatibility across heterogeneous data processing environments. Once the compression and formatting processes are complete, transmission process 110 may verify the integrity and consistency of the transformed dataset before finalizing the output. This may involve computing checksums (e.g., MD5, SHA-256) or CRC (Cyclic Redundancy Check) values to validate data integrity and detect corruption. Metadata logs are updated with details of the applied transformations, compression techniques, and storage paths, ensuring that subsequent processes—whether ETL pipelines, data warehouses, or machine learning models—can efficiently retrieve and utilize the processed dataset. By automating these post-extraction processes, transmission process 110 optimizes data transmission, reduces storage costs, and enhances the scalability of data processing workflows.

In some implementations, transmission process 110 may store 308 the data retrieved from the source in a target (e.g., storage device 116 from FIG. 1 or DTF target database load 702 in FIG. 7) in a location/path based on the metadata. Subsequently, the compressed and formatted data is securely transmitted to the designated target file path, which may include on-premises storage or cloud storage solutions like AWS S3, using transmission protocols such as Connect Direct, SFTP, or SCP.

In some implementations, transmission process 110 may create 320 an audit trail for the metadata and in some implementations, the audit trail may include one or more of timestamps for execution start and completion times for retrieval of the data, transmission status, and error logs. For instance, as noted above, throughout the process, detailed audit trails and logging mechanisms capture comprehensive metadata-related information, including timestamps for data pipeline execution start and completion times, transmission status, error logs, and other diagnostic data. This audit functionality enables traceability, debugging, and compliance adherence.

Figure 7:
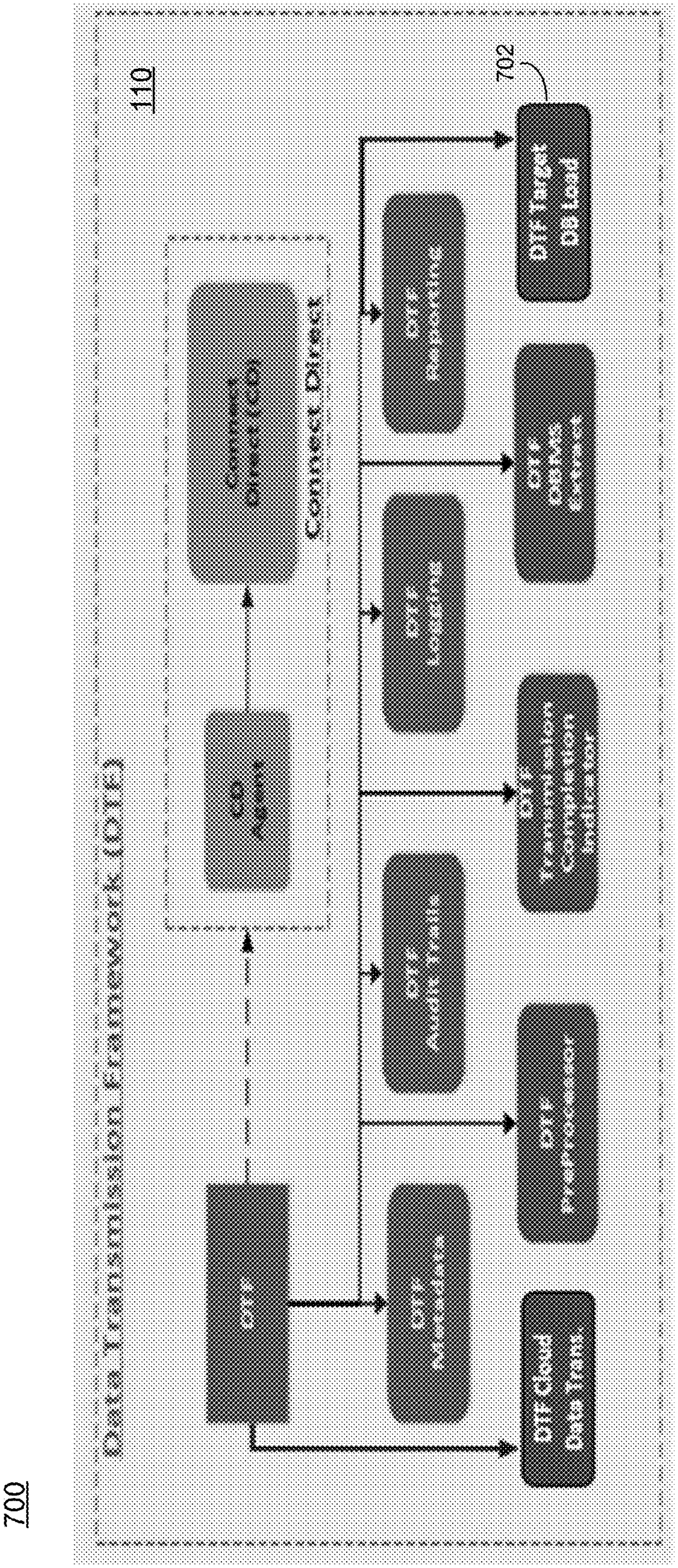
FIG. 7 is an example diagrammatic view of a data transmission framework of a transmission process according to one or more example implementations of the disclosure.

Referring at least to the example implementation of FIG. 7, an example data transmission framework 700 of transmission process 110 is shown. As can be seen in FIG. 7, the data transmission framework (DTF) of transmission process 110 serves as the central orchestrator, managing data transmission while integrating with metadata handling, audit trails, logging, and reporting. Transmission process 110 has various example and non-limiting modules that interact with various components, including a CD Agent and Connect: Direct (CD), a secure file transfer protocol that ensures reliable data transmission between systems. The DTF Metadata module handles structured metadata, guiding the transmission process by specifying source, destination, and transformation rules. The DTF Audit Trails component tracks data movement, ensuring compliance and traceability. Additionally, DTF Logging records system events for monitoring and debugging, while the DTF Reporting module generates analytical insights. Transmission process 110 processes extracted data through different DTF processing components such as the DTF PreProcessor, which prepares data before transmission, and the DTF Transmission Completion Indicator, which confirms successful transmission. The DTF DBMS Extract module retrieves data from databases, while the DTF Target DB Load ensures proper storage at the destination. This example framework enables the present disclosures automated, metadata-driven data transmission with auditability, security, and efficiency, making it suitable for enterprise data integration, ETL workflows, and secure cloud or database migrations.

Figure 8:
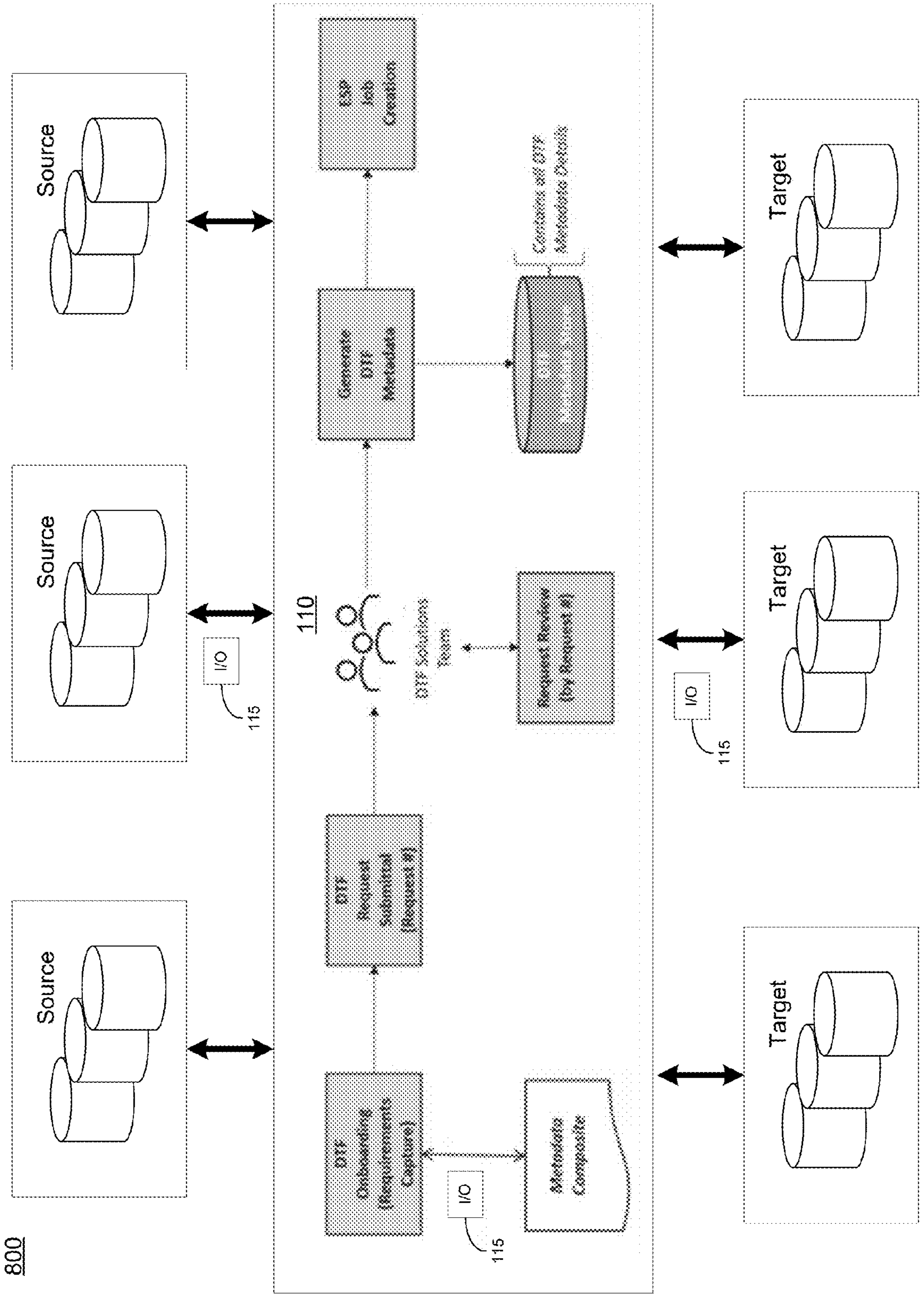
FIG. 8 is an example high level flowchart of a transmission process according to one or more example implementations of the disclosure.

Referring at least to the example implementation of FIG. 8, an example metadata capture workflow 800 of transmission process 110 described throughout is shown. The DTF Metadata Capture Workflow diagram shows the structured process of capturing, reviewing, storing, and utilizing metadata to automate data pipeline execution. As noted throughout, transmission process 110 uses DTF Onboarding, where application data pipeline requirements are captured and recorded in a Metadata Composite document. Following onboarding, a DTF Request Submittal generates a unique request number, which is then reviewed by the DTF Solutions Team (or via an AI module of transmission process 110). During the review stage, the team (or AI module) interacts with the requestor to validate and refine the metadata details. Once the review is completed, transmission process 110 proceeds to Generate DTF Metadata, where an automated process of transmission process 110 translates the request into structured metadata records stored in the DTF Metadata Store (repository). This repository contains all essential metadata details, which are later used to orchestrate and execute data pipelines. Finally, the workflow triggers ESP Job Creation, where the DTF framework runs automated ESP (Enterprise Scheduling Platform) jobs to manage data transmission and processing tasks.

Thus, the present disclosure enables significant technical improvements over existing data pipeline creation by using a fully automated metadata-driven methodology, allowing dynamic, rapid, and scalable creation of data pipelines. Unlike traditional Extract, Transform, Load (ETL) processes that rely heavily on manual development and coding, this framework uses standardized forms and automated metadata conversion and processing, significantly reducing the time, labor, and costs associated with data pipeline creation.

It will be appreciated after reading the present disclosure that multiple variations or extensions of the framework may be used without departing from the scope of the present disclosure. For instance, different types of orchestrators may be used (such as ESP, Airflow, CA-7), alternative data transmission methods may be used (such as Connect Direct, SCP, SFTP), varied compression algorithms may be used, advanced data filtering options may be used, enhanced metadata validation techniques may be used, and capabilities for handling hybrid or multi-cloud environments may be used. As such, the specific algorithms and protocols used should be taken as example only and not to otherwise limit the scope of the present disclosure.

The terminology used herein is for the purpose of describing particular implementations only and is not intended to be limiting of the disclosure. As used herein, the singular forms "a", "an" and "the" are intended to include the plural forms as well, including any steps performed by a/the computer/processor, unless the context clearly indicates otherwise. As used herein, the phrase "at least one of A, B, and C" should be construed to mean a logical (A OR B OR C), using a non-exclusive logical OR, and should not be construed to mean "at least one of A, at least one of B, and at least one of C." As another example, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof. Example sizes/models/values/ranges can have been given, although examples are not limited to the same.

The terms (and those similar to) "coupled," "attached," "connected," "adjoining," "transmitting," "communicating," "receiving," "connected," "engaged," "adjacent," "next to," "on top of," "above," "below," "abutting," and "disposed," used herein is to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner. The term "set" does not necessarily exclude the empty set—in other words, in some circumstances a "set" may have zero elements. The term "non-empty set" may be used to indicate exclusion of the empty set—that is, a non-empty set must have one or more elements, but this term need not be specifically used. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The corresponding structures, materials, acts, and equivalents (e.g., of all means or step plus function elements) that may be in the claims below are intended to include any structure, material, or act for performing the function in combination with other claimed elements as specifically claimed. While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited. While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block may be separated into multiple blocks. Unless explicitly stated as mutually exclusive, features depicted in different drawings can be combined consistent with the principles of the present disclosure. Moreover, although this disclosure describes and depicts respective implementations herein as including particular components, elements, feature, functions, operations, or steps (and arrangements thereof), any of these implementations may include any combination, arrangement, or permutation of any of the components, elements, features, functions, operations, or steps described or depicted anywhere herein that a person having ordinary skill in the art would comprehend after reading the present disclosure. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The description of the present disclosure has been presented for purposes of illustration and description but is not intended to be exhaustive or limited to the disclosure in the form disclosed. After reading the present disclosure, many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated. The features of any dependent claim may be combined with the features of any of the independent claims or other dependent claims.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, comprising:
- receiving a data transmission request associated with data to be retrieved from a data source;
- converting data requirements of the data transmission request associated with the data into a structured spreadsheet, wherein converting includes mapping each row of the structured spreadsheet into a metadata entry aligning form columns to database columns in a metadata repository;
- generating metadata based upon, at least in part, the data requirements of the data transmission request associated with the data;
- generating a job to retrieve the metadata;
- retrieving the data from the source according to the metadata; and
- storing, in a target, the data retrieved from the source in a location based on the metadata.

2. The computer-implemented method of claim 1, wherein the data requirements of the data transmission request associated with the data include one or more of a source database storing the data, database type storing the data, a file system storing the data, a file system type storing the data, schema definitions, table name, data element of the data to extract, filter criteria, custom queries, output data format preference, target location to store the data, naming convention, and a frequency at which to execute data extraction.

3. The computer-implemented method of claim 1, wherein the data transmission request is received from a template on a frontend computing device.

4. The computer-implemented method of claim 3, wherein the template is a fillable form.

5. The computer-implemented method of claim 4 further comprising performing a validation process of the data requirements of the data transmission request associated with the data.

6. The computer-implemented method of claim 1, wherein generating the metadata includes translating the structured spreadsheet into a structured metadata record within the metadata repository.

7. The computer-implemented method of claim 6, wherein the metadata repository is a relational database.

8. The computer-implemented method of claim 6, wherein the metadata repository is a non-relational database.

9. The computer-implemented method of claim 6, wherein the metadata repository stores one or more of unique data pipeline identifiers, source system details, custom queries, default queries, database filters, targeted file storage locations, file naming patterns, timestamps, and execution frequency.

10. The computer-implemented method of claim 9, wherein source system details include one or more of database type, schema name, table name, connection credentials, and partition details.

11. The computer-implemented method of claim 1, wherein retrieving the data from the source according to the metadata includes triggering automated processing components that utilize the metadata to determine how to process the data.

12. The computer-implemented method of claim 11, wherein the automated processing components compress the data.

13. The computer-implemented method of claim 11, wherein the automated processing components format the data according to the metadata.

14. The computer-implemented method of claim 1, further comprising creating an audit trail for the metadata.

15. The computer-implemented method of claim 14, wherein the audit trail includes one or more of timestamps for execution start and completion times for retrieval of the data, transmission status, and error logs.

16. The computer-implemented method of claim 1, wherein the data is financial data.

17. A computer program product residing on a non-transitory computer readable storage medium having a plurality of instructions stored thereon which, when executed across one or more processors, causes at least a portion of the one or more processors to perform operations comprising:

receiving a data transmission request associated with data to be retrieved from a data source;

converting data requirements of the data transmission request associated with the data into a structured spreadsheet, wherein converting includes mapping each row of the structured spreadsheet into a metadata entry aligning form columns to database columns in a metadata repository;

generating metadata based upon, at least in part, the data requirements of the data transmission request associated with the data;

generating a job to retrieve the metadata;

retrieving the data from the source according to the metadata; and storing, in a target, the data retrieved from the source in a location based on the metadata.

18. A computing system comprising:

one or more processors; and one or more memories having a plurality of instructions stored thereon which, when executed across the one or more processors, causes at least a portion of the one or more processors to perform operations comprising:

receiving a data transmission request associated with data to be retrieved from a data source;

converting data requirements of the data transmission request associated with the data into a structured spreadsheet, wherein converting includes mapping each row of the structured spreadsheet into a metadata entry aligning form columns to database columns in a metadata repository;

generating metadata based upon, at least in part, the data requirements of the data transmission request associated with the data;

generating a job to retrieve the metadata;

retrieving the data from the source according to the metadata; and storing, in a target, the data retrieved from the source in a location based on the metadata.

19. The computer program product of claim 17, wherein generating the metadata includes translating the structured spreadsheet into a structured metadata record within the metadata repository.

20. The computing system of claim 18, wherein generating the metadata includes translating the structured spreadsheet into a structured metadata record within the metadata repository.

* * * * *